United States Patent [19]

Morris

[11] Patent Number: 4,890,566

[45] Date of Patent: Jan. 2, 1990

[54] RETRACTABLE CLEAT

[76] Inventor: John L. Morris, 1640 E. Delmar, Springfield, Mo. 65804

[21] Appl. No.: 173,878

[22] Filed: Mar. 28, 1988

[51] Int. Cl.$^4$ .............................................. B63B 21/04
[52] U.S. Cl. .................................. 114/218; 24/115 R; 410/107; 410/111
[58] Field of Search ................. 114/218; 410/107, 111; 24/115 R, 115 K

[56] References Cited

U.S. PATENT DOCUMENTS

| | | | |
|---|---|---|---|
| 2,729,417 | 1/1956 | Maynard | 410/111 |
| 3,102,708 | 9/1963 | Crain | 410/107 |
| 4,354,445 | 10/1982 | Kafka et al. | 114/218 |

FOREIGN PATENT DOCUMENTS 635569  1/1935  Fed. Rep. of Germany ...... 114/218

Primary Examiner—Sherman D. Basinger
Assistant Examiner—Thomas J. Brahan
Attorney, Agent, or Firm—Kokjer, Kircher, Bradley, Wharton, Bowman & Johnson

[57] ABSTRACT

The device of this invention includes a cleat disposed within a cavity formed by an exterior housing in a manner permitting the cleat to be moved between an extended position where the cleat is accessible to receive a boat line and a retracted position where the cleat is retracted into the cavity. The mechanism that allows the movement of the cleat between a retracted and extended position is within the cavity and includes a spring and a latching mechanism. The latching mechanism includes a latching member that pivotally moves within the latching mechanism between a latching position that holds the cleat in the retracted position and a release position where the latch member releases the cleat to the extended position under the influence of the spring. The latching mechanism allows for the cleat to be alternated between the extended and retracted position by successive depressions of the cleat into the cavity.

10 Claims, 2 Drawing Sheets

4,890,566

RETRACTABLE CLEAT

BACKGROUND OF THE INVENTION

This invention relates in general to a device for securing boat lines and more particularly to a device and mechanism presenting a cleat that can alternate between an extended and a retracted position.

In many boating situations it is necessary to secure or tie a line or rope to the boat or to secure a boat to a dock. When sailing, lines from the sail need to be secured after trimming the sail; when fishing, fresh bait or catch baskets may need to be stored in the water and therefore need to be secured off the side of the boat; recreational boating needs a device to tie off recreational equipment; and any number of various reasons to tie off ropes or lines can be envisioned in particular boating situations and in non-boating situations.

Presently, devices to secure ropes and lines exist on boats, but they all exhibit the disadvantage of permanently protruding above the surface of the boat. As such, these currently used devices are unsightly and bothersome. When not in use, these devices often get in the way of other activities in, or uses of, the boat. More particularly known upstanding cleats are a safety hazard to those walking or working on the boat deck in that they are easy to trip over and can painfully inflict injury to bare feet or other body parts.

It is thus evident that a need exists especially in the boating industry for a device for securing lines that is accessible for use hen needed, but that can also be moved to an inaccessible position when not needed.

It is therefore a primary object of the present invention to provide a device for securing lines from boats that is conveniently accessed when needed.

As a corollary to the primary object of this invention, it is an object of the present invention to provide such a device that can be alternated between an accessible extended position and an inaccessible retracted position.

It is another object of the present invention to provide a device for securing a boat line that can be positioned so as not to interfere with other uses of the boat when the device is not needed.

It is a further object of the present invention to provide a cleat to which boat lines may be secured that can be positioned on a surface of a boat, or a gunwale of the boat, that protrudes above the surface of the boat to be accessed when needed and retracts to a position substantially flush with the boat surface when not needed.

It is a still further object of the present invention to provide a mechanism whereby a cleat can be alternated between an extended and retracted position.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figures 2, 3, 4:
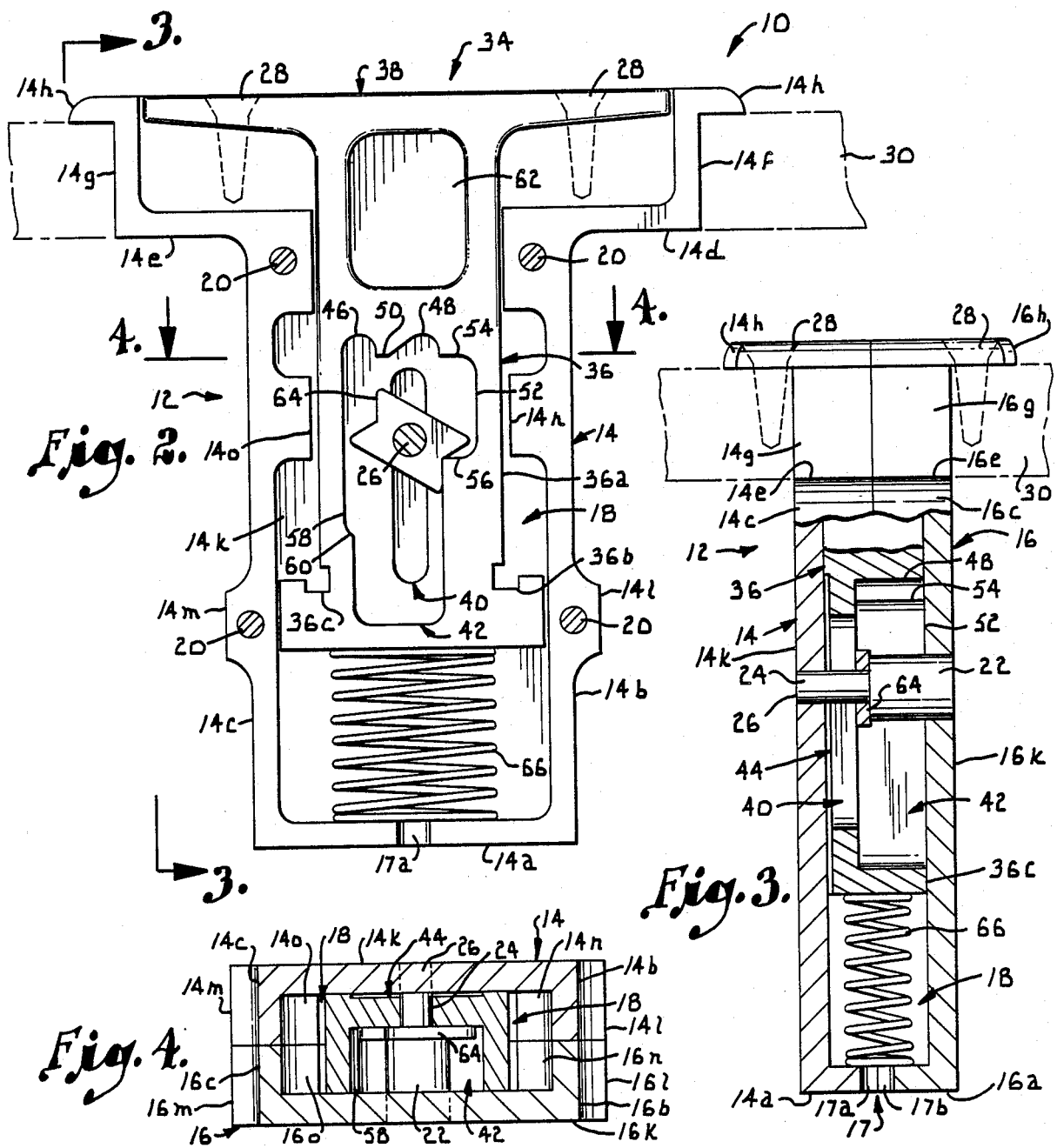
FIG. 2 is a front elevational view of the present invention with one half of the housing removed showing the cleat in the retracted position.
FIG. 3 is a side elevational view through the line 3—3 in FIG. 2 partially cut away to show the interrelationship of the housing, cleat and latching mechanism.
FIG. 4 is a top elevational view through the line 4—4 in FIG. 2 again showing the interrelationship of the housing, cleat and latching mechanism.

The retractable cleat device of the present invention is generally depicted in FIG. 2 and is given the numeral 10. The device is comprised of a housing 12 and has two halves 14 and 16. Each half 14 and 16 of housing 12 is generally "T" shaped. As can be seen in FIG. 2, housing half 14 has a bottom surface 14a, two opposing side surfaces 14b and 14c, surfaces 14d and 14e that extend outwardly from the corresponding side surface 14b and 14c that are generally parallel to base surface 14a and ending in vertical surfaces 14f and 14g that are substantially parallel to side surfaces 14b and 14c. Vertical surfaces 14f and 14g also present a flange 14h. Housing half 14 also has a back surface 14k such that one-half of cavity 18 is formed between the surfaces of housing half 14. An aperture 17 is presented through the bottom of housing 12 so that any water that seeps into cavity 18 will not build up therein, but will instead flow through said cavity thereby preventing deterioration of the cleat mechanism possibly caused by rust or freezing. Aperture 17 is preferably circular and can be placed anywhere on housing 12 so long as water trapped inside cavity 18 can flow out of the cavity through said aperture. Preferably, aperture 17 is created by a semi-circular groove 17a formed in bottom surface 14a of housing half 14 and a corresponding semi-circular groove 17b formed in bottom surface 16a of housing half 16. Semi-circular groove 17a and 17b are formed in a manner such that when housing halves 14 and 16 are connected to form the overall device and each cavity therebetween, circular aperture 17 is formed. This cavity 18 can best be seen in FIGS. 3 and 4.

As can also be seen in FIGS. 2 and 4, side surface 14b presents lug 14l and side surface 14c presents a lug 14m. Lugs 14l and 14m each present an opening 20 therethrough in which a fastener or other coupling means may be inserted to connect housing halves 14 and 16 together.

Housing half 16 (see FIGS. 3 and 4) is similar to housing half 14 in that it has a base 16a, opposing side surfaces 16b and 16c, upper surfaces 16d and 16e generally parallel to base surface 16a, vertical surfaces 16f and 16g that are generally parallel to side surfaces 16b and 16c and a flange surface 16h. Housing half 16 also presents a back surface 16k to form the other half of cavity 18. Shown by FIG. 4, housing half 16 also presents lugs 16l and 16m corresponding to surfaces 16b and 16c with an opening therethrough (not shown) to receive or accept a fastening means by which halves 14 and 16 are connected together to form housing 12 with complete cavity 18 therebetween. Referring back to FIG. 2, additional openings 20 are presented near the top of surfaces 14b and 14c of housing half 14 that also accept or receive fastening means to securely join housing halves 14 and 16 together. Although not shown, housing half 16 presents corresponding openings 20 near the top of housing half 16 surfaces 16b and 16c to receive or accept the corresponding fastening means from housing half 14.

Referring to FIGS. 2 and 4, protruding into cavity 18 from side surfaces 14b and 14c are stop surfaces 14n and 14o, respectively. Stop surfaces 16n and 16o protrude into cavity 18 from housing half 16 in a position corresponding to the stop surfaces 14n and 14o of housing half 14.

Cylindrical support 22 (and cylindrical spindle 24) is integral with back surface 16k and extends into cavity 18. Spindle 24 is of a lesser diameter than support 22 such that an object with an opening may be inserted through spindle 24 and thereby rest on the greater diameter support 22. Support 22 extends approximately half way through cavity 18 and spindle 24 extends through the other half of cavity 18 and continues through an opening 26 in housing surface 14k of housing half 14 such that when the two housing halves 14 and 16 are coupled together the outer most surface of spindle 24 is approximately flush with the outermost surface of surface 14k of housing half 14.

As can be seen in FIG. 3, flange surfaces 16h and 14h present openings 28 therethrough for accepting a fastening bolt or screw such that housing 12 may be secured, preferably, to the upper ledge of a gunwale 30 of a boat or other sailing vessel 32. When the housing 12 of a device 10 of the present invention is secured atop an opening in gunwale 30 of boat 32 it will typically appear as that shown in FIG. 1. Although not shown, an opening to fittingly receive housing 12 must be made in gunwale 30 so that the housing 12 is positioned inside the gunwale opening and flanges 14h and 16h support the housing 12 on the upper surface of gunwale 30 and is secured thereto by fastening means inserted through openings 28 in the corresponding flanges 14h and 16h.

Housing halves 14 and 16 of housing 12 may be manufactured by any known method and can be made of a variety of materials such as steel, aluminum, plastics, or any other material that is generally water tight, but is preferably made of steel or an alloy thereof. Each housing half 14 or 16 may be a single molded piece or the surfaces may be welded together to form the housing half. The preferred method of manufacture is to have each half of housing 12 to be a single molded piece.

Referring now to FIG. 2, a cleat 34 is shown disposed within cavity 18 of housing 12. Cleat 34 is also generally "T" shaped and is dimensioned to fit within the T-shaped cavity 18 formed between housing halves 14 and 16. In particular, cleat 34 has a shank portion 36 and a head portion 38 extending outwardly from shank 36. Head 38 has dimensions corresponding to that part of cavity 18 formed by surfaces 14d, 14e, 14f, 14g, 14k, 16d, 16e, 16f, 16g and 16k. Shank 36 of cleat 34 has a shaft portion 36a dimensional to fit within cavity 18 as bounded by stop surfaces 14n, 14o, 14k, 16n, 16o and 16k. The shaft 36a of shank 36 ends in a pair of legs 36b and 36c that are dimensionally wider than shaft 36a and are as wide as cavity 18 as bounded by side surfaces 14b, 14c, 16b, and 16c. Therefore, as shaft 36a of shank 36 of cleat 34 moves in a vertical direction through cavity 18 its upward vertical movement is limited to the point where legs 36b and 36c contact with stop surfaces 14n, 14o, 16n and 16o.

Shaft 36a of shank 36 also presents 3 grooves thereon; spindle groove 40, latching groove 42, and lubricant groove 44 which is best seen in FIG. 3.

Lubricant groove 44 is a shallow groove on one surface of shaft 36a that is rectangular in shape and of dimensions slightly less than the height and width of the shaft 36a of shank 36 of cleat 34. This groove is filled with a lubricant such as axle grease or other lubricant so that when cleat 34 moves between its extended and retracted position within housing 12 there is a layer of lubrication between the surface of housing 12 and cleat 34 so as to avoid undue wear on the device.

Spindle groove 40 is also presented on shaft 36a of shank 36 of cleat 34 and is generally oval shaped of a width to receive spindle 24 therethrough. Spindle groove 40 is also of a vertical length to enable cleat 34 to move between its retracted and extended positions and to provide upper and lower boundaries of said movement. Spindle groove 40 creates a through opening in shaft 36a of shank 36 of cleat 34.

Latching groove 42 is formed on the surface opposite lubricating groove 44 and does not create a through opening except in the area that overlaps spindle groove 40. Latching groove 42 is an asymmetrical groove and is an integral part of the mechanism whereby cleat 34 can be latched in a retracted position and subsequently released to its extended position. Latching groove 42 has a pair of asymmetrical arcs 46 and 48 at one end of said groove 42 that are separated by a surface 50. On one side of groove 42 is a short notch 52 having an upper shoulder 54 and lower shoulder 56. On the side opposite the side of groove 42 having notch 52 is an elongated notch 58 terminating in a shoulder 60. The remainder of groove 42 is generally rectangular in shape.

The upper portion of shaft 36a of shank 36 of cleat 34 is shown in FIG. 2 with an opening 62 therethrough to form two separate surfaces to which a rope or line can be attached to cleat 34 when it is in its extended position. It is contemplated that the upper portion of shaft 36a of shank 36 of cleat 34 could be a solid shaft or comprise a plurality of openings therethrough to form a plurality of surfaces to which ropes may be tied individually. Head 38 of cleat 34 is a generally horizontal planar surface integral with shank 36.

As can initially be seen in FIG. 2, latch 64 is positioned within latching groove 42. Latch 64 is a planar surface having "V" shaped notches at ends approximately 180° from each other and an aperture positioned approximately about the mid point of latch 64. Latch 64 is mounted through its aperture on spindle 24 and sits atop support 22. This allows latch 64 to rotate about spindle 24 which acts as its axis. As such, latch 64 is positioned within latching groove 42 and atop spindle groove 40. Latch 64 is of such dimensions to enable it to pivot within latching groove 42 about an arc less than 180° at a time. The V-shaped ends of latch 64 are formed such that each one can individually and alternately contact with shoulder 56 of notch 52 and register therewith to prevent cleat 34 from proceeding to its extended position.

Spring 66 is positioned between the bottom of housing 12 and the bottom of cleat 34. Spring 66 is of such a tension, or spring force, that it can urge cleat 34 to the extended position when it is not latched, and is yet yieldable enough to permit depression of said cleat from the extended position to return it to its latched, retracted position. Spring 66 can be of any common shape or be prepared by any various methods or materials.

The retractable cleat device 10 of the present invention is assembled by placing latch 64 onto base 22 of housing half 16 through spindle 24, and then placing said cleat 34 atop latch 64 on base 22 by inserting cleat 34 through spindle groove 40 onto spindle 24 with latching groove 42 coming in contact with latch 64. Housing half 14 is then placed atop cleat 34 with spindle 24 being positioned inside opening 26 of housing half 14. Grease or other lubricants should be placed between support 22 and latch 64, and between latch 64 and latching groove 42 so that the parts can easily move therebetween. The housing halves are fastened together by any variety of means through openings 20 in housing halves 14 and 16 and is then ready to be positioned on boat 32 or other objects as needed.

Figure 7:
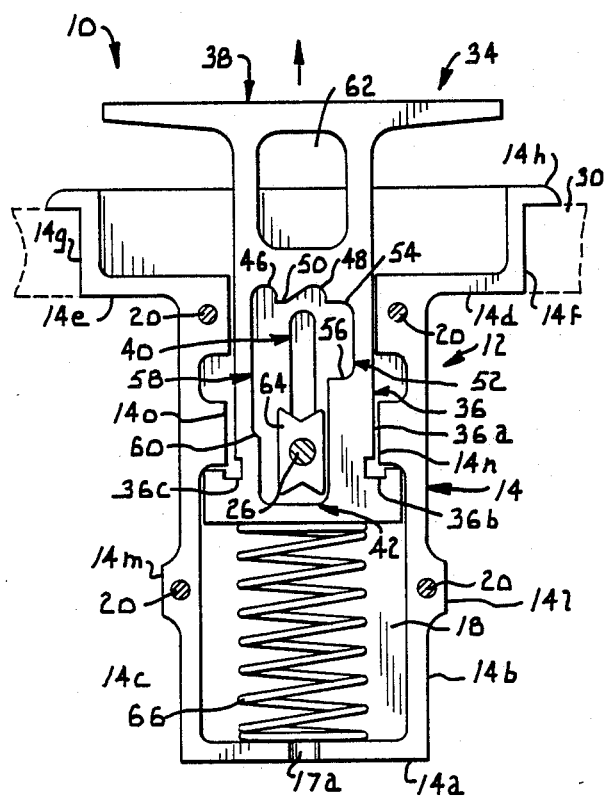
FIG. 7 is a front elevational view showing the device of the present invention in the extended position.
Figure 8:
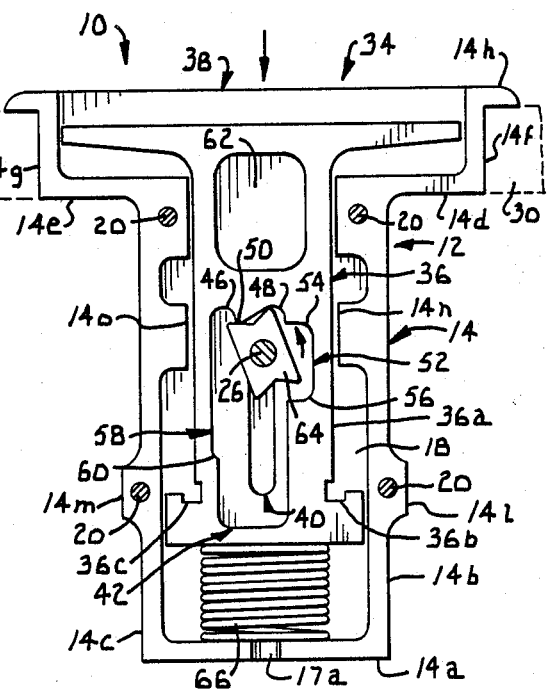
FIG. 8 is a front elevational view showing the cleat depressed into the cavity of the housing from the extended position and the pivotal repositioning of the latch member to return to the retracted, latched position of FIG. 2.

When device 10 of the present invention is assembled as described above, cleat 34 can be moved between an extended position, as shown in FIG. 7, and a latched retracted position, as shown in FIG. 2. The interrelationship of latch 64, latching groove 42, spring 66 and cleat 34 allow such movement of cleat 34 within said cavity 18 of housing 12. To achieve said movement between the retracted and extended position requires alternate depressions upon cleat 34.

Figure 5:
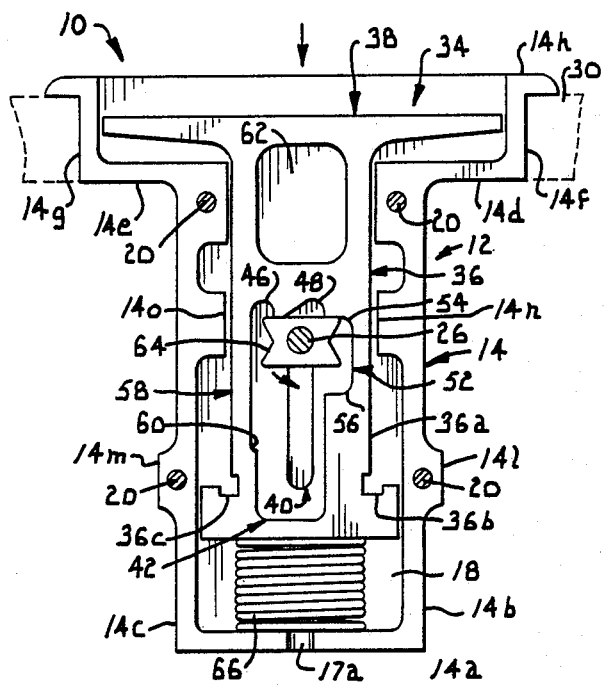
FIG. 5 is a front elevational view showing the cleat depressed from the retracted position of FIG. 2 and the movement of the latch member from the latching position.

To illustrate the above movement, a cleat is shown in its retracted and latched position in FIG. 2. As can be seen, head 38 of cleat 34 is substantially at the top of cavity 18. As to the latching mechanism, one of the V-shaped ends of latch 64 is in registration with shoulder 56 of notch 52 of latching groove 42 such that the pressure exerted by spring 66 on cleat 34 cannot push cleat 34 outside of said cavity 18. This position locks said cleat 34 in its retracted position. In order to move the cleat to its extended position, pressure must be exerted on head 38 of cleat 34 to depress said cleat further in cavity 18 as shown in FIG. 5. This depression of cleat head 38 compresses spring 66 and moves surface 50 of latching groove 42 contact with latch 64. This contact between latch 64 and surface 50 pivots latch 64 about spindle 24 through an angle less than 180° and takes latch 64 out of a position where its V-shaped ends can register with shoulder 56 of notch 52 and latch the cleat in said retracted position again. As pressure is released from head 38 of cleat 34, the spring force of spring 66 is exerted upon cleat 34 and forces the cleat upward through cavity 18 to a point where the non V-shaped surface of latch 64 comes in contact with shoulder 56 of notch 52.

Figure 6:
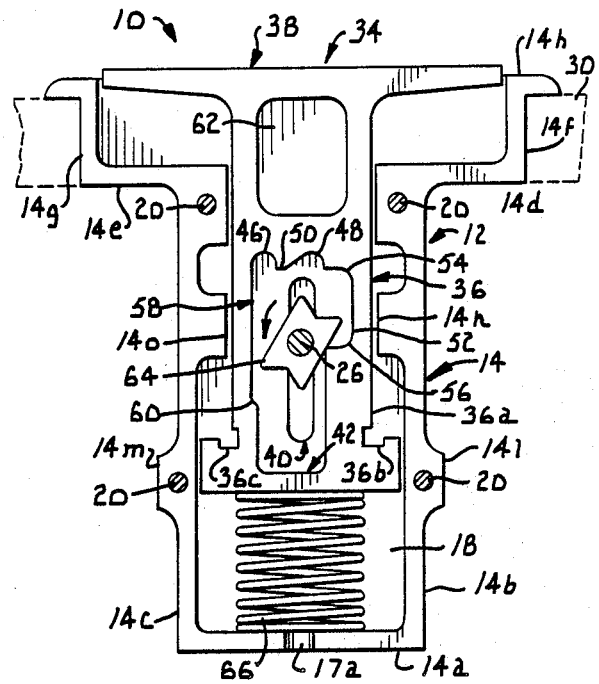
FIG. 6 is a front elevational view showing the pivotal movement of the latch member when the cleat is released from the depressed position of FIG. 5.

As can be seen in FIG. 6, when planar surfaces of latch 64 comes in contact with shoulder 56 of notch 52, latch 64 pivots again about spindle 24 and through notch 58 of latching groove 42 such that said V-shaped ends of latch 64 are directed toward said upper and lower portions of latching groove 42 and allows spring 66 to continue exerting its force against cleat 34 until legs 36b and 36c of cleat 34 come in contact with stop surfaces 14n, 14o, 16n and 16o to inhibit any further extension of cleat 34 outside of cavity 18. At this point latch 64 is positioned near the bottom of latching groove 42 and spindle groove 40 as is shown in FIG. 7. This is the extended and accessible position of cleat 34 whereby cleat head 38 and the upper surfaces of said shaft 36a of shank 36 of cleat 34 is accessible for tying off ropes or lines from boats or any other desired object.

In order to return the cleat from its extended position to its latched or retracted position, cleat head 38 is again depressed from its extended position thereby compressing spring 66 and forcing cleat 34 back into cavity 18. As this is occurring, cleat 34 moves from the bottom of spindle groove 40 to the top of spindle groove 40 thereby again causing contact between surface 50 of latching groove 42 and the same V-shaped end of latch 64 that was previously in registration with shoulder 56 of notch 52 to pivot latch 64 again less than 180° about spindle 24 to position said other V-shaped end of latch 64 in position to register with shoulder 56 of notch 52 and latch cleat 34 in its retracted position when pressure is released from cleat head 38.

Figure 1:
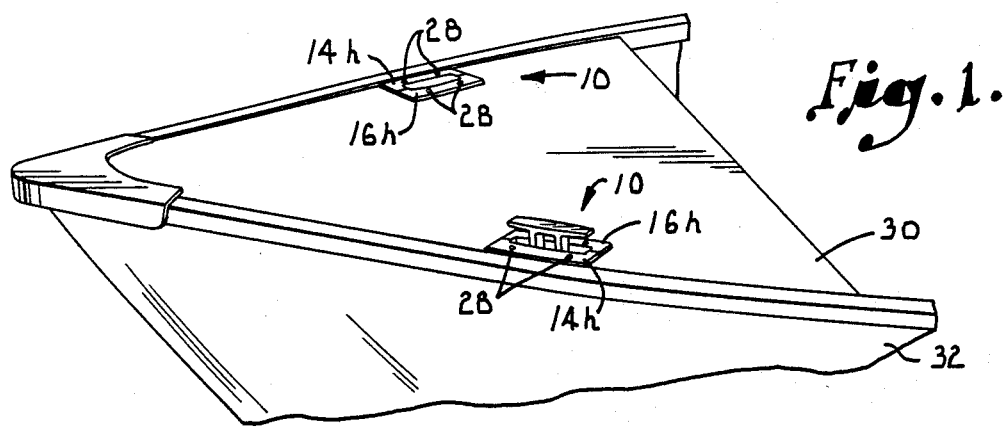
FIG. 1 is a perspective view of a preferred use of the device of the present invention.

In use, the device 10 of the present invention can be inserted in an opening in a gunwale 30 of a boat 32 as shown in FIG. 1 where cleat 34 is shown in its extended and accessible position and its retracted and latched position.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention we claim:

1. A device for securing a boat line or the like, comprising:
   a housing presenting a cavity therein;
   a cleat to which the boat line may be secured, said cleat being received in said cavity for movement between an extended position wherein the cleat is accessible to receive the boat line and a retracted position wherein the cleat is retracted into the cavity;
   releasable means acting to urge said cleat toward the extended position, said releasable means being yieldable to permit said cleat to be depressed to the retracted position;
   a latch member having a latch surface for engagement with the cleat in a manner to latch same in its retracted position;
   means for mounting said latch member on the housing for movement between a latching position wherein said latch surface is located to engage said cleat for latching same in the retracted position, and a release position wherein said latch surface is disengaged from the cleat to permit movement thereof to the extended position under the influence of said releasable means; and
   means for effecting movement of said latch member between the latching and release positions, said movement effecting means arranged in a manner to alternatively effect the latching and release positions of said latch member in response to successive depressions of said cleat.

2. A device for securing a boat line or the like, comprising:
   a housing presenting a cavity therein;

a cleat to which the boat line may be secured, said cleat being received in said cavity for movement between an extended position wherein the cleat is accessible to receive the boat line and a retracted position wherein the cleat is retracted into the cavity;

releasable means acting to urge said cleat toward the extended position, said releasable means being yieldable to permit said cleat to be depressed to the retracted position;

a latch member having a latch surface for engagement with the cleat in a manner to latch same in its retracted position;

means for mounting said latch member on the housing for pivotal movement between a latching position wherein said latch surface is located to engage said cleat for latching same in the retracted position and a release position wherein said latch surface is disengaged from the cleat to permit movement thereof to the extended position under the influence of said releasable means;

means for pivoting said latch member between the latching and release positions, said pivoting means arranged in a manner to alternatively effect the latching and release positions of said latch member in response to successive depressions of said cleat.

3. A device as set forth in claim 2, including:
a shoulder on said cleat; and
a notch on said latch member at a location and oriented to receive said shoulder therein when the cleat is in the retracted position and the latch member is in the latching position, thereby latching the cleat in the retracted position, said notch being out of registration with the shoulder in the release position of the latch member.

4. A device as set forth in claim 3, including a surface on said cleat at a location to engage said latch member in a manner to pivot same to the release position when the cleat is depressed while in the retracted position.

5. A device as set forth in claim 4, wherein said surface of the cleat is located to engage said latch member in a manner to pivot same to the latching position when the cleat is depressed into the housing from the extended position.

6. A device for securing a boat line or the like, comprising:
a housing presenting a cavity therein;
a cleat having a shank and a head on the shank for receiving the boat line, said cleat being received in said cavity for movement between an extended position wherein the cleat is accessible to receive the boat line and a retracted position wherein the cleat is retracted into the cavity;
spring means for continuously urging said cleat toward the extended position; and
latch means for alternatively latching said cleat in the retracted position and releasing the cleat for movement to the extended position in response to successive depressions of the cleat, said latch means comprising a latch member mounted on the housing for pivotal movement between a latching position wherein the latch member engages the cleat in a manner to hold same in the retracted position and a release position wherein the latch member is released from the cleat to permit movement of same to the extended position under the influence of said spring means, said cleat presenting a surface thereon engageable with said latch member to alternatively pivot same between the latching and release positions in response to successive depressions of the cleat.

7. A device as set forth in claim 6, including:
opposite ends of said latch member each presenting a notch, said notches being offset by substantially 180°; and
a shoulder on said cleat at a location to engage the latch member alternately on said notches each time the latch member reaches the latching position.

8. A device as set forth in claim 7, wherein said surface and shoulder of the cleat are arranged to effect movement of the latch member through a pivot arc less than 180° to the release position when the cleat is depressed while in the retracted position.

9. A device as set forth in claim 8, wherein said surface of the cleat is arranged to effect movement of the latch member through a pivot arc less than 180° to the latching position when the cleat is depressed while in the extended position.

10. A device for attachment in a gunwale opening of a boat to secure a boat line or the like, said device comprising:
a housing having an upper end and having a size and shape to fit in the gunwale opening, said housing presenting a cavity;
said gunwale having an upper surface;
said upper end of the housing presenting thereon an enlarged flange overlying said upper surface of the gunwale;
means for securing said housing in the gunwale opening, said securing means effective to secure said flange to the upper surface of the gunwale with the upper end of the housing substantially flush with the upper surface of the gunwale;
a cleat having a shank and a head for receiving the boat line, said cleat being received in said cavity for movement between an extended position wherein the cleat is accessible to receive the boat line and a retracted position wherein the cleat is retracted into the cavity;
spring means for urging said cleat toward the extended position;
a latch member mounted on said housing at a location within said cavity for pivotal movement between a latching position wherein the latch member is effective to latch said cleat in the retracted position and a release position wherein the latch member releases the cleat for movement to the extended position under the influence of said spring means; and
means for selectively effecting the latching and release positions of the latch member, said means being arranged to alternately effect the latching and release positions of the latch member in response to successive depressions of the cleat.

* * * * *